United States Patent
Chapman

(10) Patent No.: US 7,340,486 B1
(45) Date of Patent: Mar. 4, 2008

(54) SYSTEM AND METHOD FOR FILE SYSTEM SNAPSHOT OF A VIRTUAL LOGICAL DISK

(75) Inventor: Dennis E. Chapman, Ben Lomond, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 326 days.

(21) Appl. No.: 10/268,840

(22) Filed: Oct. 10, 2002

(51) Int. Cl.
*G06F 17/30* (2006.01)
*G06F 13/28* (2006.01)

(52) U.S. Cl. ............... 707/200; 707/202; 711/112; 711/206

(58) Field of Classification Search ............ 707/1, 707/4, 8, 10, 101, 102, 103 R, 200, 205, 707/201, 202; 709/201, 207, 208, 230, 214, 709/226; 365/230.01; 711/114, 206, 112
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A * | 10/1999 | Hitz et al. | ............ 707/202 |
| 6,038,570 A | 3/2000 | Hitz et al. | |
| 6,065,037 A | 5/2000 | Hitz et al. | |
| 6,425,035 B2 | 7/2002 | Hoese et al. | |
| 6,614,709 B2 * | 9/2003 | Spiegel et al. | ......... 365/230.01 |
| 2002/0029326 A1 * | 3/2002 | Reuter et al. | ............ 711/206 |
| 2002/0112022 A1 | 8/2002 | Kazar et al. | |
| 2002/0116593 A1 | 8/2002 | Kazar et al. | |

OTHER PUBLICATIONS

Thekkath et al., Frangipani: a scalable distributed file system, 1997, ACM Press, pp. 224-237.*
Brown et al., The Alpine file system, 1985, ACM Press, pp. 261-293.*
Heidermann et al., File-system development with stackable layers, 1994, ACM Press, pp. 58-89.*
Lee et al., "Petal: distributed virtual disks", 1996, pp. 84-92.*
Maintenance Procedures ND (8C) nd-network disk control Feb. 1985.
Misc. Reference Manual Pages ND (4P) nd-network disk driver Jul. 26, 1985.
Asante EN/SC Adapter Family Installation Guide May 1994.

(Continued)

*Primary Examiner*—John Breene
*Assistant Examiner*—Fred I Ehichioya
(74) *Attorney, Agent, or Firm*—Cesari and McKenna, LLP

(57) ABSTRACT

A system and method generates a consistent file system snapshot of a virtual logical disk (VLD). The system and method ensures that database files are stored on the VLD are consistent at the time a snapshot is generated by first flushing all buffers and then blocking I/O operations to the VLD until the snapshot is generated.

31 Claims, 4 Drawing Sheets

OTHER PUBLICATIONS

Asante Desktop EN/SC Adapters User's Manual Apr. 1996.

Performance Without Compromise: The Virtual Storage Architecture 1997.

Anthony J. McGregor Department of Computer Science, University of Waikato Dissertation: Block-Based Distributed File Systems Jul. 1997.

U.S. Appl. No. 09/932,578, filed Jun. 27, 2002, Blake Lewis et al.

U.S. Appl. No. 10/188,250, Dennis E. Chapman.

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

U.S. Appl. No. 10/188,250, filed Jul. 2, 2002, Dennis E. Chapman.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14( 2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, Sigmod Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

* cited by examiner

SYSTEM AND METHOD FOR FILE SYSTEM SNAPSHOT OF A VIRTUAL LOGICAL DISK

FIELD OF THE INVENTION

The present invention relates to databases and, more particularly to restoring a database from an archived copy.

BACKGROUND OF THE INVENTION

Microsoft® Exchange is a messaging and collaboration software system that provides a variety of applications for group interaction using networked computer systems. Specifically, Microsoft Exchange (available from Microsoft Corporation of Redmond, Wash.) provides support for electronic mail (e-mail) over various networks. To that end, the Exchange software provides an e-mail server to support remotely connected e-mail clients such as, e.g., Microsoft Outlook®. The Exchange software acts as a server for providing various functionalities to clients. An Exchange server can run on a variety of operating systems including, for example, the Microsoft Windows® 2000 operating system.

In a typical configuration, Microsoft Exchange stores data, organized as databases, associated with e-mail services in two files. In the particular example of Microsoft Exchange 2000 the databases are an .edb file and a .stm file. In each Microsoft Exchange 2000 database, the .edb file is a properties file and the .stm files hold streaming data. The streaming data file contains raw content that has been received via, for example, the Internet, and is stored in its native format. Pointers are created by the Exchange server within the .edb file to reference the various messages or data stored within the .stm file. The default storage locations for these databases are on a disk locally connected to the computer on which the Exchange software is running.

FIG. 1 is a flow chart illustrating a path of an exemplary e-mail passing through an Exchange server. In step 105, the electronic mail is received via conventional e-mail processes. These processes can include the use of such protocols as Simple Mail Transport Protocol (SMTP). Next, in step 110, the message is stored in the memory of a database server. The storage of the message in memory is often transient in nature until the message is committed to some form of nonvolatile storage. The e-mail message is then written to a log file in step 115. The log file typically has a preallocated size, for example 5 megabytes (MB) in size. When the current log file reaches the preallocated size, the database server creates a new log file. Thus, an Exchange server may have a variable number of log files at any given point-in-time, depending on how many log files have been incorporated into the database files. Next, the log files are written to and incorporated into the database files, in step 120. The writing of the log file to database occurs in a lazy write fashion. A "lazy write" is a writing process or procedure of the Exchange software that performs a write operation when central processing unit cycles are available. Thus, this lazy write proceeds typically during off-peak times when the server is not being heavily utilized.

FIG. 2 is a schematic block diagram of an exemplary Exchange server environment 200. An exemplary server 205 executing, e.g., the Microsoft Windows 2000 operating system containing a local disk 210 is shown connected to a backup tape drive 220 and an external disk 215. The external tape drive 220 is connected via either a small computer system interface (SCSI) connection or a switching network, such as storage area network (SAN). Similarly, the external disk 215 may be connected via a SAN or other suitable networking architecture. The Exchange server 205 may be incorporated into a Microsoft Clustering System (MSCS) environment 225 that provides redundant data program access to clients. Additionally, the Exchange server 205 is operatively interconnected with a network 230. The network 230 may be a local area network (LAN), a wide area network (WAN), a virtual private network (VPN) or any other suitable networking scheme. Connected to the network 230 is a number of clients 235, each of which utilizes the services of the Exchange server 205 by passing Exchange commands and data to the server 205 over the network 230.

In a known example of an Exchange server, the Exchange software provides an application program interface (API) that is accessible by other programs executing on the server for performing backup and restore operations on the various databases. Other applications or processes executing on the server can access these APIs to perform various backup/restore operations. These APIs are targeted toward the use of a tape drive as a backup storage device. Such backup operations are normally performed while the Exchange server is operating. As tape drives typically have a slower read/write time than disk drives, the backup of databases with a tape device can consume a significant amount of time. Although the Exchange server is operational during as backup operation, performance is degraded during the course of the backup operation. Due to the extended degradation caused by the use of tape devices a backup storage media, backups are typically performed at night (or other off-peak time), when few users are utilizing the system. Similarly, a restore operation using a tape device consumes a substantial amount of time to restore the databases. When performing a backup or restore operation, the database files and any unincorporated logs need to be saved and/or restored. Thus as the sizes of the various database files increase, the time required to perform a backup/restore operation to a tape device also increases.

In a further known example, the Exchange server is adapted to have the database and log files preferably written to a local disk. However, by utilizing other software products such as, e.g., SnapDrive® available from Network Appliance, Inc. of Sunnyvale, Calif., the log files and databases may be written to a virtual logical disk (VLD) stored on disks connected to a file server. In this example, the other software product replaces a block protocol data access driver executing on the Exchange server with one that is adapted to support VLD operations. These VLD and modified driver, described further below, are also described in U.S. patent application Ser. No. 10/188,250, entitled SYSTEM AND METHOD FOR MAPPING BLOCK-BASED FILE OPERATIONS TO FILE LEVEL PROTOCOLS, by Dennis E. Chapman, the contents of which are hereby incorporated by reference.

A file server is a computer that provides file service relating to the organization of information on storage devices, such as disks. The file server or filer includes a storage operating system that implements a file system to logically organize the information as a hierarchical structure of directories and files on the disks. By "file system" it is meant generally a structuring of data and metadata on storage devices, such as disks, which permits reading/writing of data on those disks. A file system also includes mechanisms for performing these operations. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared LAN, WAN, or VPN implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system also available from Network Appliance, Inc. of Sunnyvale, Calif. The WAFL™ file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that implements file system semantics and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL-based file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

As described in the above-incorporated United States patent application, a client of a file server may utilize a data access protocol driver that implements VLDs on a file server. The data access protocol driver supplements the traditional protocol layer stack of the client's operating system. Illustratively, the VLD stores data according to the file system semantics of the client. Thus, in the example noted above, the VLD stores data using the conventional NT File System (NTFS). Notably, the file embodying a VLD is sized to the storage size of the virtual logical disk, for example tens of gigabytes. Each VLD stored on the file server illustratively utilizes a set naming convention. For example, the file is named "XXXX.VLD" where "XXXX" is a unique identifier associated with the client which created the virtual logical disk. It is expressly contemplated that other naming conventions can be utilized with the present invention and as such the naming convention described herein is exemplary only.

Broadly stated, when the file system of a client issues a block access request to access data, the data access protocol driver, executing on the client determines whether the request is directed to a physical disk or to a VLD. If the request is directed to a disk, then the data access protocol driver forwards the requested block access operation on to that disk. In these instances, the data access protocol driver functions similar to a traditional block-based protocol driver, e.g., a SCSI driver. Otherwise, the block access protocol driver maps the block access request to a file access request and forwards that request to the file server using a file access protocol, such as the conventional Network File System (NFS). In response, the file server performs the requested operation to the file and returns the results to the client using the file access protocol. The data access protocol driver then maps the file access response to a block access response and returns that response to the file system.

A file server, as described above may be interconnected by a network to an Exchange or other database server to provide file service operations. In the example of an Exchange database server, various database files may be stored on VLDs managed by a file server. As noted, the file server typically utilizes a tape device for backup/restore operations and a substantial amount of time is required to perform a backup operation to a tape device. Consequently, many system administrators do not frequently perform backup operations, thus preventing system performance degradation due to the ongoing backup operation. Yet, to restore a database to a particular point-in-time, the administrator typically requires a backup of the file system or database files generated at the desired point-in-time. As backups are typically written to tape devices with lengthy intervals between successive backups, the possible selection of discrete points-in-time to restore to is generally limited.

Another noted disadvantage of the prior art is that by taking a snapshot of a VLD, the contents of the VLD are not guaranteed to be consistent. The snapshotting process is described, in further detail in U.S. patent application Ser. No. 09/932,578 entitled INSTANT SNAPSHOT by Lewis et al. By "snapshot" it is meant generally a rapid generation of an image of the data at a certain point-in-time. Snapshot is a trademark of Network Appliance Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or another persistent memory and having a name or other identifier that distinguishes it from other PCPIs taking in other points-in-time. A PCPI can also include other information (metadata) about the active file system at the particular point-in-time for which the image is taken. The terms (PCPI) and (snapshot) shall be used interchangeably throughout this patent without derogation of Network Appliance's trademark rights. For example, various buffers in the file system, protocol driver, or application of the server that is writing data to the VLD may still contain data that has not been written to the VLD. This is due to the fact that the client file system, for example NTFS, is unaware of the snapshot capabilities of the underlying VLD. Thus, simply generating a snapshot of a VLD at a given point-in-time does not guarantee that all data currently associated with a database is captured by the snapshot.

SUMMARY OF THE INVENTION

The disadvantages of the prior art are overcome by providing a system and method for generating snapshots of virtual logical disks (VLDs) containing coherent images of database files stored on a database server. To ensure that the database files stored within the VLDs are consistent a snapshot manager issues a backup command that places the database server (e.g., a Microsoft Exchange database server) into a backup mode. This forces the database server to write data from buffers to its file system (e.g., NTFS file system) for storage on disks. Next, a backup agent executing on the server sends a flush command to the NTFS file system. This flush command forces the NTFS file system to write all data stored in its buffers to disk. By issuing these two commands, the system and method ensures that all data associated with a given database are written to the VLD.

A data access protocol driver executing on the Exchange server is then alerted, via a remote procedure call (RPC) or application program interface (API) to block all input/output (I/O) operations directed to the VLD. This command ensures that no data will be written to the VLD while a snapshot is generated. Another RPC containing instructions to generate a snapshot of the volume containing the VLD is then sent to the file server, such as a filer, that is serving the VLD. The filer generates a snapshot using conventional snapshotting procedures. Once a snapshot is generated, the data access protocol driver is instructed to begin allowing I/O requests directed to the VLD. Finally, the snapshot manager alerts the Microsoft Exchange database server that it may exit the backup mode and return to the normal mode.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A. Network Environment

Figure 1:
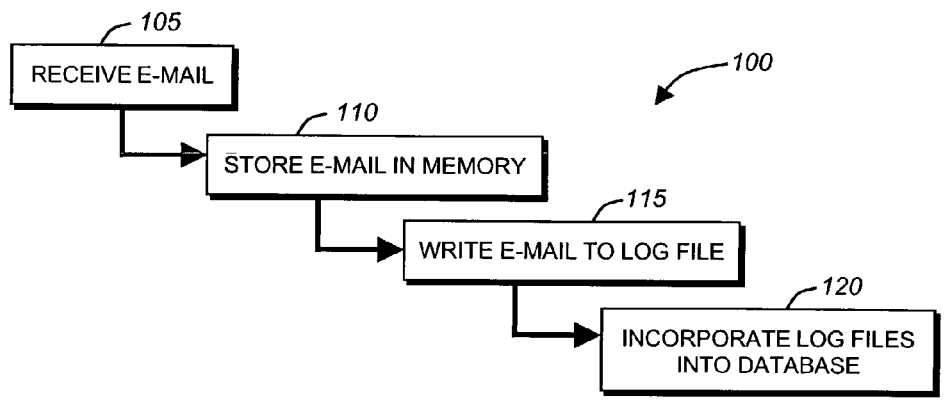
FIG. 1, already described, is a flow chart detailing the steps that an electronic message follows in accordance with an Exchange server according to the prior art.
Figure 2:
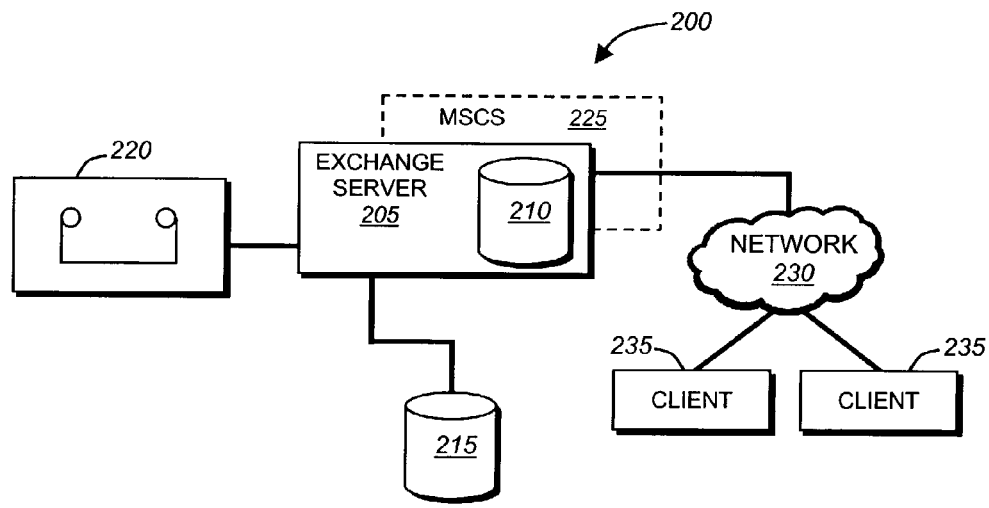
FIG. 2, already described, is a schematic block diagram of an exemplary Microsoft® NT server executing Exchange having an external disk and tape drive according to the prior art.
Figure 3:
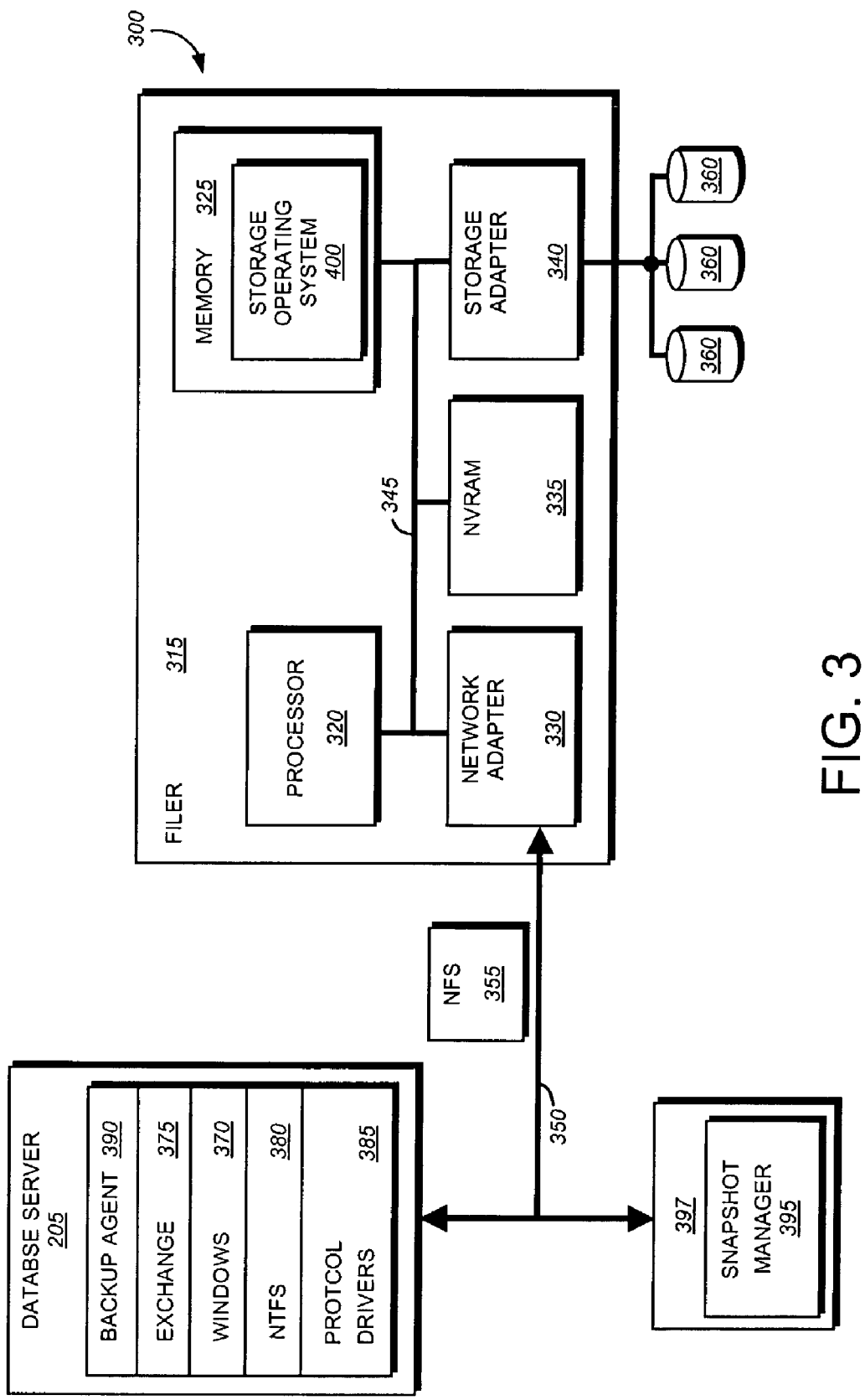
FIG. 3 is a schematic block diagram of an exemplary Exchange server and file server in accordance with an illustrative embodiment of the present invention.

FIG. 3 is a schematic block diagram of a storage system environment 300, including a database server 205 interconnected with a file server 315 over a network that may be advantageously used with the present invention. The file server or "filer" 315 is a computer that provides file service relating to the organization of information on storage devices, such as disks 360. It will be understood to those skilled in the art that the inventive technique described herein may apply to any type of special-purpose computer (e.g., server) or general-purpose computer, including a standalone computer. The filer 315 comprises a processor 320, a memory 325, a network adapter 330 and a storage adapter 340 interconnected by a system bus 345. Executing within the memory 325 of the filer is a storage operating system 400 (FIG. 4) that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, filer 315 can be broadly, and alternatively, referred to as a storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 325 comprises storage locations organized as buffers that are addressable by the processor and adapters for storing software program code and date structures. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The operating system 400, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 330 comprises the mechanical, electrical and signaling circuitry needed to connect the filer 315 to an Exchange or database server 205 over a computer network 350, which may comprise a point-to-point connection or a shared medium, such as a local area network (LAN), wide area network (WAN) or virtual private network (VPN). Moreover, the database server 205 may interact with the filer 315 in accordance with a client/server model of information delivery. That is, the client (database server) may request the services of the filer, and the filer may return the results of the services requested by the client, by exchanging packets 355 utilizing, e.g., the conventional Network File System (NFS) protocol or Common Internet File System (CIFS) protocol format over the network 350.

The storage adapter 340 cooperates with the operating system 400 (FIG. 4) executing on the filer to access information requested by the client. The information may be stored on the disks 360 that are attached, via the storage adapter 340, to the filer 315 or other node of a storage system as defined herein. The storage adapter 340 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 320 (or the adapter 340 itself) prior to being forwarded over the system bus 345 to the network adapter 330, where the information is formatted into a packet and returned to the server 205.

In one exemplary filer implementation, the filer 315 can include a nonvolatile random access memory (NVRAM) 335 that provides fault-tolerant backup of data, enabling the integrity of filer transactions to survive a service interruption based upon a power failure, or other error. The size of the NVRAM depends in part upon its implementation and function in the file server. It is typically sized sufficiently to log a certain time-based "chunk" of transactions (for example, several seconds worth).

In an illustrative embodiment, the disks 360 are arranged into a plurality of volumes, each having a file system associated therewith. The volumes each include one or more disks 360. In one embodiment, the physical disks 360 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

Within the database server 205 are layers of software including, the Windows operating system 370, the Exchange database server 375, NT file system layer 380, a protocol driver layer 385 and a backup agent 390. In the exemplary embodiment, the Windows layer 370 is embodied as the Windows 2000 operating system. It should be noted that alternate operating systems may be utilized in accordance with the teachings of the present invention.

A file system designed for use with the Windows 2000 operating system 370 is the NT File System (NTFS) 380. In NTFS, each unit of information associated with a file, including its name, its owner, its time stamps and its data contents, is implemented as a file attribute. Both files and directories have attributes, wherein each attribute consists of a single stream or sequence of bytes. This implementation facilitates the addition of more attributes, including data content attributes, to a file.

An application, such as Microsoft Exchange 375, running on the database server 205 may be unable to utilize networked data storage because file system operations provided by a file access protocol may not fully match the operations provided by NTFS 380 residing on the client. For example, some operations that are available on the NTFS file system used with the Windows 2000 operating system are not available over the CIFS protocol. As a result, the application can only write data to, and read data from, locally attached storage devices of the server using a block access protocol, such as the SCSI protocol. The data access protocol driver 385 provides support for mapping these block access commands to a file-level protocol, such as NFS. Additionally, the protocol driver 385 supports emulating a physical disk by the use of a virtual logical disk (VLD) 365 stored on filer 315 interconnected with the database server 205.

In operation, an application issues a disk operation (e.g., a read or write operation) command to NTFS 380 using conventional NTFS application program interfaces (API). This disk operation is then passed to the data access protocol driver 385. The protocol translation function of the data access protocol driver maps the requested disk operation to the appropriate file service protocol request. This mapping generates an appropriately formatted request in the selected file service protocol, such as NFS. The file service protocol request is then sent to the appropriate file server (e.g., filer 315) using known networking techniques. The filer performs the requested operation and returns the results of the operation. That may include, for example, acknowledgment that the write operation was successful, or, if the requested operation was a read operation, the requested data. Once the results of the operation have been received by the server, they are mapped to the appropriate block-based protocol and returned to the NTFS layer 380, which passes them on to an application, such as the Exchange server 375.

The backup agent 390 executing on the database server 205 is, in the illustrative embodiment, implemented as a Microsoft Windows 2000 service. The backup agent 390 interacts with the protocol driver 385 and a snapshot manager 395 executing on a client 397 connected to the database server 205 via network 350. The backup agent 390 performs several of the message passing functions, described further below, in accordance with the illustrative embodiment of the present invention. The snapshot manager 395 comprises backup management software for managing the creation and restoration of backups of the database. An exemplary snapshot manager is the SnapManager® for Exchange Software, available from Network Appliance, Inc., of Sunnyvale, Calif.

B. Storage Operating System

To facilitate generalized access to the disks 360, the storage operating system 400 (FIG. 4) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the storage operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 4:
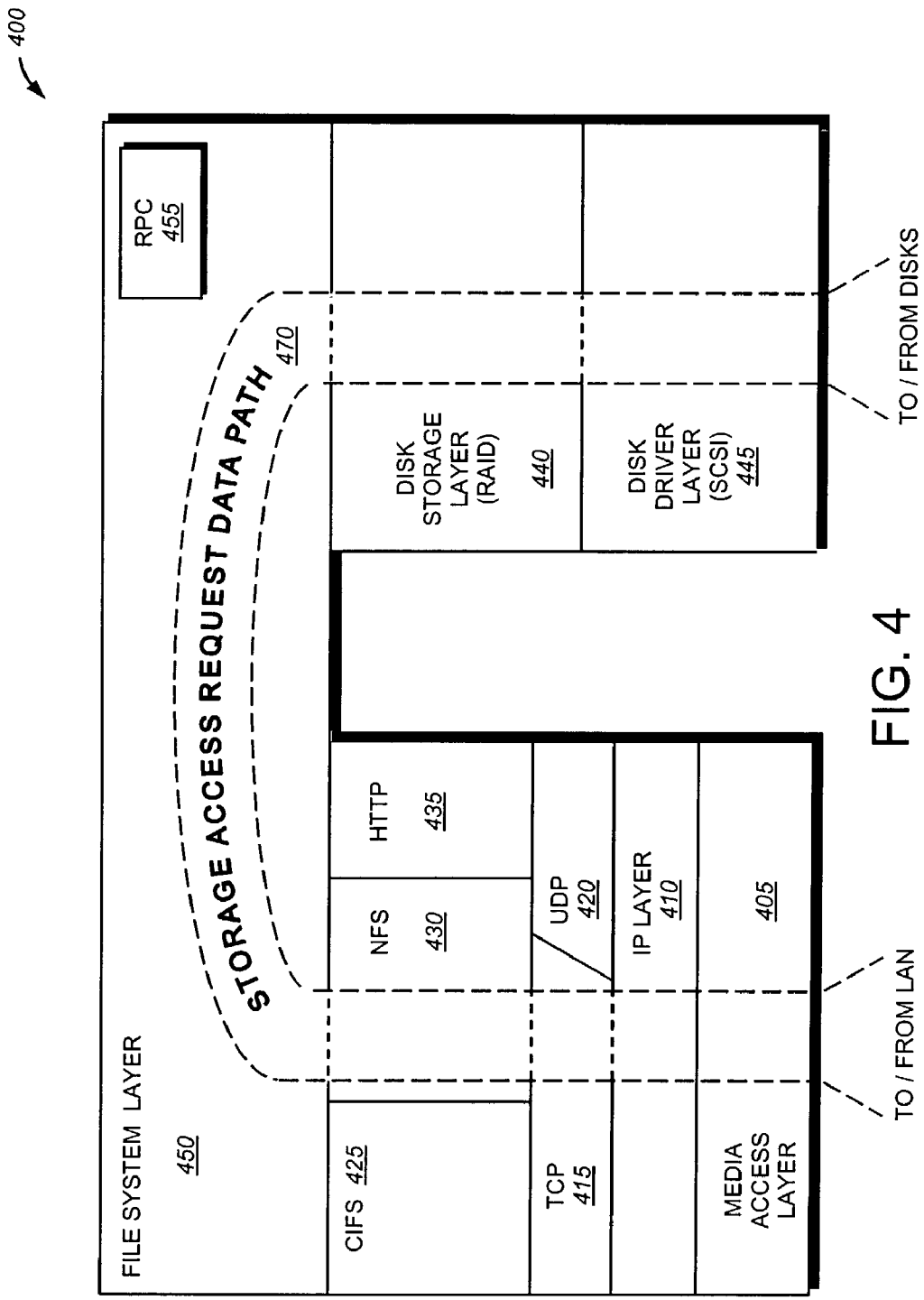
FIG. 4 is a schematic block diagram of an exemplary storage operating system for use on the file server of FIG. 3.

The organization of the preferred storage operating system for the exemplary filer is now described briefly. However, it is expressly contemplated that the principles of this invention can be implemented using a variety of alternate storage operating system architectures. As shown in FIG. 4, the storage operating system 400 comprises a series of software layers, including a media access layer 405 of network drivers (e.g., an Ethernet driver). The operating system further includes network protocol layers, such as the Internet Protocol (IP) layer 410 and its supporting transport mechanisms, the Transport Control Protocol (TCP) layer 415 and the User Datagram Protocol (UDP) layer 420. A file system protocol layer provides multi-protocol data access and, to that end, includes support for the CIFS protocol 425, the NFS protocol 430 and the Hypertext Transfer Protocol (HTTP) protocol 435. In addition, the storage operating system 400 includes a disk storage layer 440 that implements a disk storage protocol, such as a RAID protocol, and a disk driver layer 445, that implements a disk control protocol such as the small computer system interface (SCSI).

Bridging the disk software layers with the network and file system protocol layers is a file system layer 450 of the storage operating system 400. Generally, the layer 450 implements a file system having an on-disk format representation that is block-based using, e.g., 4-kilobyte (KB) data blocks and using inodes to describe the files. In response to transaction requests, the file system generates operations to load (retrieve) the requested quested data from volumes if it is not resident "in-core", i.e., in the filer's memory 325. If the information is not in memory, the file system layer 450 indexes into an inode file using an inode number of the file to access an appropriate entry and retrieve a logical volume block number. The file system layer 450 then passes the logical volume block number to the disk storage (RAID) layer 440, which maps that logical number to a disk block number and sends the latter to an appropriate driver (for example, an encapsulation of SCSI implemented on a fibre channel disk interconnection) of the disk driver layer 445. The disk driver accesses the disk block number from the volumes and loads the requested data in memory 325 for processing by the filer 315. Upon completion of the request, the filer (and storage operating system) returns a reply, e.g., a conventional acknowledgement packet 355 defined by the CIFS specification, to the server 205 over the network 350.

The file system layer 450 includes support for various remote procedure calls (RPC) 455. RPCs permit an application executing on another computer to remotely call various functions via, e.g., a CIFS data packet. Such remote functions, described further below, include e.g. taking a snapshot of a file system of a volume. Specifically, the file system layer 450 includes RPCs 455 for generating a snapshot of a given file or volume. These "snapshotting" RPCs may be utilized by clients or applications executing on various computers connected to a network interconnected with a file server.

It should be noted that the software "path" 470 through the storage operating system layers described above needed to perform data storage access for the client request received at the filer may alternatively be implemented in hardware or a combination of hardware and software. That is, in an alternate embodiment of the invention, the storage access request data path 470 may be implemented as logic circuitry embodied within a field programmable gate array (FPGA) or an application specific integrated circuit (ASIC). This type of hardware implementation increases the performance of the file service provided by filer 315 in response to a file system request packet 355 issued by the database server 205.

C. Backup Operations

As noted above, prior backup implementations typically only perform a backup operation during the evening (or other off-peak time) due to system performance degradation caused by the backup operation. By storing the database files on a VLD on a file server, faster backups can be accomplished using, e.g., a file server's inherent snapshot capabilities. While this description is written in terms of the techniques utilized by Network Appliance, Inc. in generating Snapshots™, it is expressly contemplated that other methodologies of creating snapshots or other duplicated copies can be utilized in accordance with the teachings of the present invention.

Figure 5:
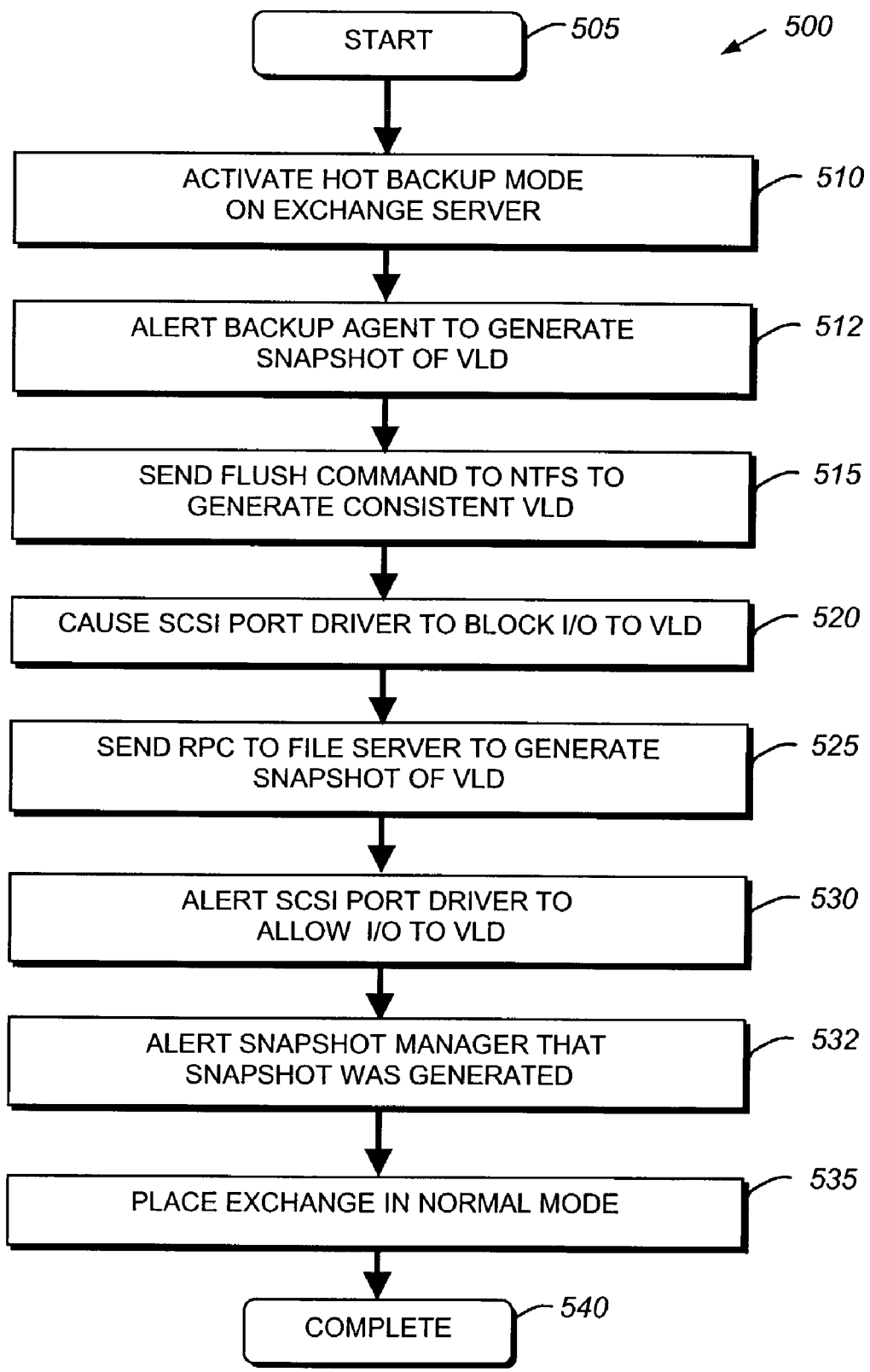
FIG. 5 is a flowchart detailing the steps of a procedure for generating a file system snapshot of a VLD in accordance with an embodiment of the present invention.

FIG. 5 is a flowchart detailing the steps of a procedure 500 for generating a file system snapshot of a VLD containing coherent data. The procedure begins in step 505 and then proceeds to step 510 where the snapshot manager activates a hot backup mode on the Microsoft Exchange server. This hot backup mode may be activated by the use of conventional APIs published by Microsoft in conjunction with the Microsoft Exchange database server. For example, the snapshot manager may utilize the conventional HrBackupPrepare( ) API function or command to connect to the Exchange server and prepare it for backup. By entering the hot backup mode, the Exchange database server empties all memory buffers by writing the contents of the buffer to the file system.

The snapshot manager then, in step 512, alerts the backup agent to generate a snapshot of the VLD. This may be accomplished by sending a conventional interprocess communication (IPC) message between the snapshot manager and the backup agent. In step 515, the backup agent sends a flush command to the NTFS layer of the operating system executing the Exchange database server. This conventional flush command causes the NTFS layer to write all data stored in its buffers to the protocol block driver to be written to disk. In effect, this flush command causes the NTFS layer to generate a consistent VLD. Then, in step 520, the backup agent interacts with the protocol driver to block all input/output (I/O) directed to the particular VLD. This is accomplished, in the illustrative embodiment, by the backup agent issuing a command to the protocol driver; this command may be accessed via an API associated with the port driver. Specifically, the command may be a vendor-specific extension to the conventional protocol driver API for the operating system. In response, protocol driver queues the I/O request directed to the VLD. In the exemplary embodiment, the NTFS layer is configured to lengthen the timeout value before an error is returned. This configuration permits use of disk drives that "spin down" due to lack of use. This noted feature of the NTFS layer permits several seconds worth of buffering to occur for a given VLD.

Once the protocol driver 385 has blocked I/O to the VLD, the VLD remains in its consistent state. The backup agent then sends a RPC to the filer storing the VLD to generate a snapshot of the VLD (step 525). This RPC may utilize a conventional RPC and API for a given file system. In the example of a filer 315 executing the Data ONTAP storage operating system, the backup agent utilizes the conventional NtapNetCreateSnapshot ( ) command. The snapshotting process, described further above, describes a point-in-time image of the VLD. Due to the features of the file system storing the VLD, a snapshot may be generated in seconds, thereby reducing the amount of time required for creation of a backup image of the VLD. Once the snapshot has been created and confirmed, the backup agent, in step 530, alerts the protocol driver 385 to begin allowing I/O requests to the VLD. The SCSI port driver will, in the exemplary embodiment, begin processing queued requests directed to the VLD. In the illustrative embodiment, the time to generate the snapshot (step 525) is less than the maximum buffered time allowable by the NTFS layer 380. Thus, in the illustrative embodiment, no data requests or I/O requests directed to the VLD will generate an error message or fail.

Once the protocol driver 385 reinitializes I/O data operations to the VLD, the backup agent alerts the snapshot manager that the snapshot has been created (step 532). The snapshot manager then places the Exchange database server in normal mode (step 535). The backup agent accomplishes this made change by utilizing conventional Microsoft Exchange APIs. For example, the backup agent may utilize the well-known HrBackupEnd( ) command to complete the backup operation. Once the Exchange database has returned to a normal mode of operation, the procedure is then complete (step 540).

To again summarize, the inventive system and method described herein enables the ability to generate a file system snapshot of a consistent VLD. The backup process first places the Exchange Server in a hot backup mode, which flushes all data from the Exchange buffers to the NTFS file system. The NTFS file system is then forced to flush the data to disk, by the issuance of a conventional flush command. The SCSI protocol driver executing on the Microsoft Exchange database server, then begins blocking all I/O to the VLD, which guarantees that the VLD is in consistent state. Once the VLD is in a consistent state, a snapshot is then generated of the VLD. Once the snapshot has been generated, the SCSI protocol driver then begins permitting I/O requests directed to the given VLD. Finally, the Microsoft Exchange database server is returned to a normal mode of operation, thereby allowing a resumption of data storage capabilities.

The foregoing has been a detailed description of an illustrative embodiment of the invention. Various modifications and additions can be made without departing from the spirit and scope of the invention. It is understood that other database servers and database base files can be utilized in accordance with the teachings of this invention while remaining within the scope of the present invention. In addition, while this reference has been written with reference to the Microsoft® Exchange server, file servers and filers, the principles are equally pertinent to all types of computers, including stand-alone computers. Further, it is expressly contemplated that the teachings of this invention can be implemented as software, including a computer-readable medium having program instructions executing on a computer, hardware, firmware, or a combination thereof. Accordingly this description is to only be taken by way of example and not to otherwise limit the scope of the invention

What is claimed is:

1. A method for generating a snapshot of a virtual logical disk of a storage system, comprising:
    operating a computer data storage system in a first computer, the first computer performing I/O operations with application buffers, the first computer writing contents of the application buffers to a file system operating in a second computer;
    writing data received from the first computer into file system buffers maintained by the second computer;
    maintaining a virtual logical disk by the second computer;
    writing data in the file system buffers to the virtual logical disk;
    receiving a backup command, the backup command initiating a backup of the virtual logical disk;
    moving, in response to receiving the backup command, data contents of the application buffers of the first computer to the file system buffers of the second computer;
    blocking input/output (I/O) operations directed to the virtual logical disk after
    the data contents of the application buffers of the first computer are written to the file system buffers of the second computer;
    writing, in response to the application buffers of the first computer being written to the file system buffers of the second computer, the contents of the file system buffers to the virtual logical disk; and
    generating a snapshot of the virtual logical disk while the I/O operations directed to the virtual logical disk are blocked.

2. The method as in claim 1, further comprising:
    queuing I/O operations directed to the virtual logical disk while I/O operations directed to the virtual logical disk are blocked.

3. The method as in claim 1, further comprising:
    allowing I/O operations directed to the virtual logical disk once the snapshot is generated.

4. The method as in claim 1, further comprising:
    queuing I/O operations directed to the virtual logical disk while I/O operations directed to the virtual logical disk are blocked;
    allowing I/O operations directed to the virtual logical disk once the snapshot is generated; and
    processing queued I/O operations directed to the virtual logical disk once I/O operations directed to the virtual logical disk are allowed.

5. The method as in claim 1, further comprising:
    performing the steps of moving, writing, blocking, and generating in response to activating a backup mode for the virtual logical disk.

6. The method as in claim 5, further comprising:
    returning the virtual logical disk to a normal mode in response to the snapshot of the virtual logical disk being generated.

7. The method as in claim 1, wherein the operating application is a database.

8. An apparatus for generating a snapshot of a virtual logical disk of a storage system, the apparatus comprising:
    means for operating a computer data storage system in a first computer, the first computer performing I/O operations with application buffers, the first computer writing contents of the application buffers to a file system operating in a second computer;

means for writing data received from the first computer into file system buffers maintained by the second computer;

means for maintaining a virtual logical disk by the second computer;

means for writing data in the file system buffers to the virtual logical disk;

means for receiving a backup command, the backup command initiating a backup of the virtual logical disk;

means for moving, in response to receiving the backup command, data contents of the application buffers of the first computer to the file system buffers of the second computer;

means for blocking input/output (I/O) operations directed to the virtual logical disk after the data contents of the application buffers of the first computer are written to the file system buffers of the second computer;

means for writing, in response to the application buffers of the first computer being written to the file system buffers of the second computer, the contents of the file system buffers to the virtual logical disk; and means for generating a snapshot of the virtual logical disk while the I/O operations directed to the virtual logical disk are blocked.

9. The apparatus as in claim 8, further comprising:

means for queuing I/O operations directed to the virtual logical disk while I/O operations directed to the virtual logical disk are blocked.

10. The apparatus as in claim 8, further comprising:

means for allowing I/O operations directed to the virtual logical disk once the snapshot is generated.

11. The apparatus as in claim 8, further comprising:

means for queuing I/O operations directed to the virtual logical disk while I/O operations directed to the virtual logical disk are blocked;

means for allowing I/O operations directed to the virtual logical disk once the snapshot is generated; and means for processing queued I/O operations directed to the virtual logical disk once I/O operations directed to the virtual logical disk are allowed.

12. The apparatus as in claim 8, further comprising:

means for performing the steps of moving, writing, blocking, and generating in response to activating a backup mode for the virtual logical disk.

13. The apparatus as in claim 12, further comprising:

means for returning the virtual logical disk to a normal mode in response to the snapshot of the virtual logical disk being generated.

14. Software encoded in one or more computer-readable media and when executed operable to:

operating a computer data storage system in a first computer, the first computer performing I/O operations with application buffers, the first computer writing contents of the application buffers to a file system operating in a second computer;

writing data received from the first computer into file system buffers maintained by the second computer;

maintaining a virtual logical disk by the second computer;

writing data in the file system buffers to the virtual logical disk;

receiving a backup command, the backup command initiating a backup of the virtual logical disk;

moving, in response to receiving the backup command, data contents of the application buffers of the first computer to the file system buffers of the second computer;

blocking input/output (I/O) operations directed to the virtual logical disk after the data contents of the application buffers of the first computer are written to the file system buffers of the second computer;

writing, in response to the application buffers of the first computer being written to the file system buffers of the second computer, the contents of the file system buffers to the virtual logical disk; and generating a snapshot of the virtual logical disk while the I/O operations directed to the virtual logical disk are blocked.

15. The software as in claim 14, when executed further operable to:

queue I/O operations directed to the virtual logical disk while I/O operations directed to the virtual logical disk are blocked.

16. The software as in claim 14, when executed further operable to:

allow I/O operations directed to the virtual logical disk once the snapshot is generated.

17. The software as in claim 14, when executed further operable to:

queue I/O operations directed to the virtual logical disk while I/O operations directed to the virtual logical disk are blocked;

allow I/O operations directed to the virtual logical disk once the snapshot is generated; and process queued I/O operations directed to the virtual logical disk once I/O operations directed to the virtual logical disk are allowed.

18. The software as in claim 14, when executed further operable to:

perform the move, write, block, and generate in response to activation of a backup mode for the virtual logical disk.

19. The software as in claim 18, when executed further operable to:

return the virtual logical disk to a normal mode in response to generation of the snapshot of the virtual logical disk.

20. A method for generating a snapshot of a virtual logical disk of a storage system, comprising:

operating a computer data storage system in a first computer, the first computer performing I/O operations with application buffers, the first computer writing contents of the application buffers to a file system operating in a second computer;

writing data received from the first computer into file system buffers maintained by the second computer;

maintaining a virtual logical disk by the second computer;

writing data in the file system buffers to the virtual logical disk;

issuing a backup command by a snapshot manager;

receiving the backup command, the backup command initiating a backup of the virtual logical disk;

moving, in response to receiving the backup command by the first computer, data contents of all application buffers of the first computer to the file system buffers of the second computer;

writing, in response to the application buffers of the first computer being written to the file system buffers of the second computer, the contents of the file system buffers to the virtual logical disk;

blocking all input/output (I/O) operations directed to the virtual logical disk after the data contents of the application buffers of the first computer are written to the file system buffers of the second computer;

generating a snapshot of the virtual logical disk while the I/O operations directed to the virtual logical disk are blocked.

21. The method as in claim 20, further comprising:
queuing all I/O operations directed to the virtual logical disk while I/O operations directed to the virtual logical disk are blocked.

22. The method as in claim 20, further comprising:
allowing all I/O operations directed to the virtual logical disk once the snapshot is generated.

23. The method as in claim 20, further comprising:
queuing all I/O operations directed to the virtual logical disk while I/O operations directed to the virtual logical disk are blocked;
allowing all I/O operations directed to the virtual logical disk once the snapshot is generated; and
processing queued I/O operations directed to the virtual logical disk once I/O operations directed to the virtual logical disk are allowed.

24. A method for generating a snapshot of a virtual logical disk of a storage system, comprising:
operating a computer data database system in a first computer, the first computer performing I/O operations with application buffers, the first computer writing contents of the application buffers to a file system operating in a second computer;
writing data received from the first computer into file system buffers maintained by the second computer;
maintaining a virtual logical disk by the second computer;
writing data in the file system buffers to the virtual logical disk;
receiving a backup command, the backup command initiating a backup of the first computer;
moving, in response to receiving the backup command, data contents of the application buffers of the first computer to the file system buffers of the second computer;
blocking output of the first computer from being sent to the second computer after the data contents of the application buffers of the first computer are moved to the file system buffers of the second computer;
writing the contents of the file system buffers of the second computer to the virtual logical disk after output from the first computer is blocked from being sent to the second computer; and
generating a snapshot of the virtual logical disk while the output of the first computer is blocked from being sent to the second computer.

25. The method as in claim 24, further comprising:
queuing I/O operations directed to the virtual logical disk while I/O operations directed to the virtual logical disk are blocked.

26. The method as in claim 24, further comprising:
allowing I/O operations directed to the virtual logical disk once the snapshot is generated.

27. The method as in claim 24, further comprising:
queuing I/O operations directed to the virtual logical disk while I/O operations directed to the virtual logical disk are blocked;
allowing I/O operations directed to the virtual logical disk once the snapshot is generated; and
processing queued I/O operations directed to the virtual logical disk once I/O operations directed to the virtual logical disk are allowed.

28. The method as in claim 24, further comprising:
performing the steps of moving, writing, blocking, and generating in response to activating a backup mode for the virtual logical disk.

29. The method as in claim 28, further comprising:
returning the virtual logical disk to a normal mode in response to the snapshot of the virtual logical disk being generated.

30. A method for generating a snapshot of a virtual logical disk of a storage system, comprising:
operating a computer database system in a first computer, the first computer performing I/O operations with application buffers, the first computer writing contents of the application buffers to a file system operating in a second computer;
writing data received from the first computer into file system buffers maintained by the second computer;
maintaining a virtual logical disk by the second computer;
writing data in the file system buffers to the virtual logical disk;
moving, in response to receiving the backup command, data contents of one or more application buffers of the first computer to the file system buffers of the second computer emulating a physical disk attached to an application using the virtual logical disk, wherein a driver within the application provides support for mapping block access commands to file level protocol;
receiving a backup command, the backup command initiating a backup of the virtual logical disk;
moving, in response to receiving the backup command, data contents of one or more application buffers of the first computer to the file system buffers of the second computer;
blocking input/output (I/O) operations directed to the virtual logical disk after data contents of the one or more application buffers of the first computer are moved to the file system buffers of the second computer, and
writing data contents of the file system buffers to the virtual logical disk after the application buffers of the first computer are moved to the file system buffers of the second computer;
generating a snapshot of the virtual logical disk while the I/O operations directed to the virtual logical disk are blocked.

31. A storage system, comprising:
a computer data storage system operating on a first computer, the first computer performing I/O operations with application buffers, the first computer writing contents of the application buffers to a file system operating in a second computer;
file system buffers maintained by the second computer, the contents of the application buffers of the first computer to be written into the file system buffers of the second computer;
a virtual logical disk maintained by the second computer, data written into the file system buffers to be written to the virtual logical disk;
a backup command to initiate a backup of the virtual logical disk;
data contents of the application buffers of the first computer to be moved to the file system buffers of the second computer in response to receiving the backup command;
input/output (I/O) operations directed to the virtual logical disk blocked, after data contents of the application buffers of the first computer are moved to the file system buffers of the second computer;

the contents of the file system buffers of the second computer to be written to the virtual logical disk, in response to the application buffers of the first computer being written to the file system buffers of the second computer; and a snapshot of the virtual logical disk generated while the I/O operations directed to the virtual logical disk are blocked.

* * * * *

UNITED STATES PATENT AND TRADEMARK OFFICE
CERTIFICATE OF CORRECTION

PATENT NO.         : 7,340,486 B1                                                        Page 1 of 1
APPLICATION NO.    : 10/268840
DATED              : March 4, 2008
INVENTOR(S)        : Dennis E. Chapman It is certified that error appears in the above-identified patent and that said Letters Patent is hereby corrected as shown below:

In Col. 1, line 22 should read:
    for example, the Microsoft Windows 2000 operating is In Col. 9, line 45 should read:
    operations to load (retrieve) the requested quested data from In Col. 11, line 58 should read:
    database servers and database base files can be utilized in Signed and Sealed this
Twenty-sixth Day of June, 2012

David J. Kappos
*Director of the United States Patent and Trademark Office*